United States Patent
Francis et al.

(10) Patent No.: US 6,890,075 B2
(45) Date of Patent: May 10, 2005

(54) CONTACT LENS WITH PVA COVER LAYER

(75) Inventors: Charles Auxilium Francis, Suwanee, GA (US); Richard Charles Turek, Atlanta, GA (US); Donald E. Keeley, Duluth, GA (US)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 10/152,942

(22) Filed: May 22, 2002

(65) Prior Publication Data

US 2003/0035083 A1 Feb. 20, 2003

Related U.S. Application Data

(60) Provisional application No. 60/294,470, filed on May 30, 2001.

(51) Int. Cl.⁷ .................................................. G02C 7/02
(52) U.S. Cl. .................................. 351/160 R; 351/166
(58) Field of Search ............................ 351/160 R, 162, 351/166

(56) References Cited

U.S. PATENT DOCUMENTS

| | | | |
|---|---|---|---|
| 3,536,386 A | 10/1970 | Spicack | 351/160 |
| 4,261,656 A * | 4/1981 | Wu | 351/163 |
| 4,619,793 A * | 10/1986 | Lee | 264/2.6 |
| 5,414,477 A * | 5/1995 | Jahnke | 351/162 |
| 6,579,918 B1 * | 6/2003 | Auten et al. | 523/106 |

FOREIGN PATENT DOCUMENTS

| | | |
|---|---|---|
| EP | 0 357 062 B1 | 5/1994 |
| EP | 0 390 443 B1 | 8/1995 |
| EP | 0 484 045 B1 | 2/1996 |
| WO | WO 91/06886 | 5/1991 |
| WO | WO 00/14590 | 3/2000 |

\* cited by examiner

*Primary Examiner*—Scott J. Sugarman
*Assistant Examiner*—Darryl J. Collins
(74) *Attorney, Agent, or Firm*—Rob J. Gorman; R. Scott Meece; Jian S. Zhou

(57) ABSTRACT

A contact lens having a cover layer of polyvinyl alcohol and an opaque simulated iris pattern and an associated method of manufacture. The opaque simulated iris pattern obscures the underlying natural iris for superior color transformation, and provides enhanced cosmetic effect.

11 Claims, 4 Drawing Sheets

CONTACT LENS WITH PVA COVER LAYER

This application claim the benefit of the Provisional Application Ser. No. 60/294,470, filed May 30, 2001.

BACKGROUND OF THE INVENTION

1. Field of the Invention

The present invention relates generally to optical lenses, and more particularly to a contact lens having an opaque simulated iris pattern for cosmetic enhancement and/or visual correction.

2. Description of Related Art

Optical contact lenses are frequently utilized for cosmetic effect. For example, it is known to wear a colored contact lens on the eye in an effort to alter the apparent color of the wearer's iris. Colorants such as dyes or pigments of a desired color or colors are applied to a contact lens in a pattern adapted to overlie the natural iris, thereby altering the natural iris color. Such contact lenses may provide vision correction, or may be solely cosmetic.

Creating a realistic, natural iris appearance has proven to be difficult with many known color-changing lenses. For example, the natural iris is relatively flat, whereas a typical contact lens has a significant convex-concave curvature adapted to generally match the curvature of the cornea. As a result, the use of a simulated iris pattern applied to either the concave or convex face of a contact lens often creates the unnatural appearance of a curved iris.

Attempts have been made to provide a color-changing contact lens that imparts a more natural appearance. For example, colorant may be applied to a lens in a non-opaque, color-changing iris pattern that does not completely obscure the underlying natural iris pattern. The pattern may be applied, for example, in the form of a series of colored dots producing an intermittent colored pattern over the iris area of the lens, but leaving a number of uncolored interstices between the dots. The natural iris of the wearer shows through these clear interstices, purportedly providing a more natural iris pattern and giving the appearance of depth.

It is also known to cut away a portion of a lens blank and imprint a simulated iris pattern onto the surface of the lens blank formed by the cutout. Lens material is then re-cast over the imprinted iris pattern to replace the cutout portion and encapsulate the pattern within the lens body. This process, however, is somewhat labor intensive and time consuming, and is therefore relatively expensive.

Many color-changing lenses are designated as "opaque" in the marketplace, simply by virtue of their use of colorants that have opaque properties. The manner in which the "opaque" colorants are applied to a lens, however, typically results in the lens pattern itself not being truly opaque. For example, even if the colorant comprising each individual dot is itself opaque, the iris pattern formed by a plurality of such dots is typically not opaque, as light and color are readily transmitted through the interstices between adjacent dots in the pattern. As a result, some of the wearer's natural eye color shows through the lens. This is particularly problematic when a user seeks to change a darker natural eye color to a lighter color.

Accordingly, it has been found desirable to provide a contact lens having a fully opaque iris pattern for color alteration, but presenting a realistic, natural appearance. It is also desirable to provide an efficient method for manufacturing such a lens. It is to the provision of contact lenses and associated methods of manufacture meeting these and other needs that the present invention is primarily directed.

SUMMARY OF THE INVENTION

The present invention provides a contact lens having an opaque simulated iris pattern applied thereon, and a method of forming such lenses. As used herein, a lens having an "opaque" iris pattern refers to a lens having a simulated iris pattern that substantially entirely blocks color transmission from the underlying natural iris, which might inhibit the color-changing effect of the lens. The iris pattern preferably provides the appearance of a substantially flat iris for a realistic, natural look. The lens can provide vision correction, or can be solely cosmetic.

In one aspect, the invention is a contact lens preferably including a lens body formed of substantially transparent material, an opaque simulated iris pattern applied to the lens body; and a layer of polyvinyl alcohol (PVA) overlying the simulated iris pattern.

In another aspect, the invention is a contact lens preferably including a concave base surface, a convex outer surface, and an opaque simulated iris pattern upon the contact lens along one of the concave base surface and the convex outer surface; and a layer of PVA overlying the simulated iris pattern. The opaque simulated iris pattern preferably includes at least one pattern element selectively colored and shaded to present a generally flat iris pattern appearance.

A number of further preferred and optional embodiments of the lenses of the present invention are described in greater detail below. For example, the opaque simulated iris pattern may include a plurality of (i.e., more than one) discontinuous pattern elements of different colors, which discontinuous pattern elements interlock to form a continuous and opaque pattern. One or more of the pattern element(s) may include an inner region that is more darkly shaded than adjacent portions of the pattern element. The opaque simulated iris pattern includes a cover layer of PVA overlying the pattern element(s).

In another aspect, the invention is a method of forming a contact lens. The method preferably includes applying ring-shaped aqueous solution of PVA to a mold; applying an opaque simulated iris pattern to a mold, casting a lens material in the mold to form a lens body, and transferring the opaque simulated iris pattern from the mold into the lens body.

These and other features and advantages of the present invention are described herein with reference to example embodiments shown in the appended drawing figures.

BRIEF DESCRIPTION OF THE DRAWING FIGURES

DETAILED DESCRIPTION

Figure 1A:
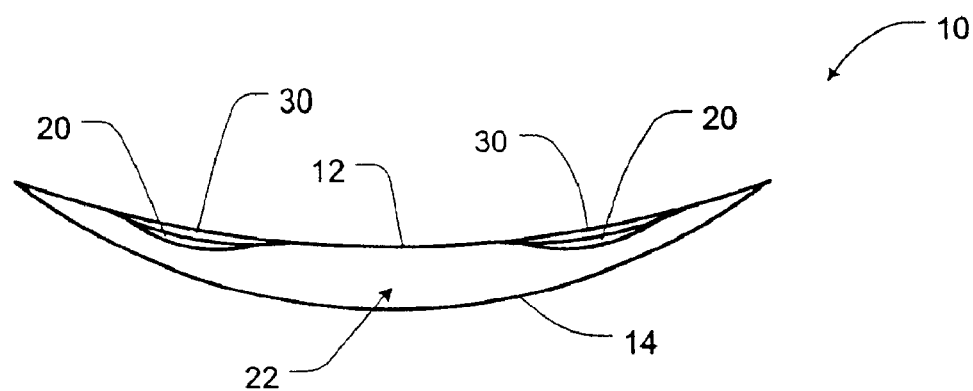
FIG. 1a is a cross-sectional side view of a contact lens according to a preferred form of the present invention.
Figure 1B:
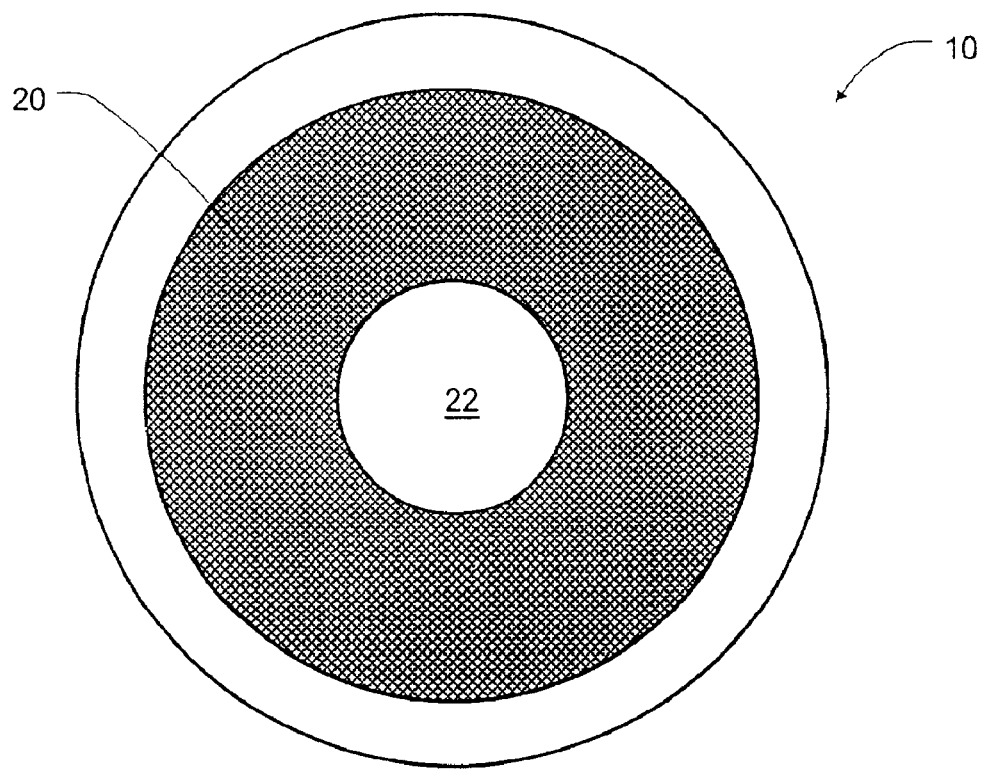
FIG. 1b is a plan view of the contact lens shown in FIG. 1.

Referring now to the drawing figures, wherein like reference numerals represent like parts throughout, preferred forms of the present invention will now be described. FIGS.

1a and 1b show a contact lens 10 according to a preferred form of the present invention. The lens 10 may be a hard lens, a soft lens, an extended wear lens, or any other type of contact lens. The lens 10 typically comprises a lens body bounded by a concave inner or base surface 12 and a convex outer surface 14. Preferably, the outer rim of the lens 10 contacts the limbal region of the wearer's eye and the center of the lens contacts the apex of the pupillary region of the cornea, providing a "three-point" fit with a layer of tears between the lens and the eye. The lens body is preferably formed of a substantially transparent, bio-compatible lens material. For example, the lens body may be formed of a polymerized hydroxyethylmethacrylate (HEMA)-based lens material, polysiloxanes, polyvinyl alcohol (PVA), hydrogels, homopolymers, copolymers, and/or other bio-compatible transparent material(s). The lens body may or may not be tinted. The lens 10 may be configured to provide a desired degree of visual correction, or may be purely cosmetic.

The lens 10 preferably further comprises an opaque simulated iris pattern 20 applied to the lens body. In a preferred form, the simulated iris pattern 20 is molded into or otherwise applied to the base surface 12 of the lens body. Alternatively, the simulated iris pattern 20 is molded into or otherwise applied to the outer surface 14. Application of the simulated iris pattern 20 to the base surface 12 improves comfort for most wearers, as the three-point fit prevents direct contact between the lens and the eye in the region of the simulated iris pattern, and as the eyelid does not contact the simulated iris pattern when the user blinks. Application of the simulated iris pattern 20 to the base surface also places the simulated iris pattern closer to the natural iris for a more realistic appearance. The simulated iris pattern is preferably applied to form an annular ring with its outer edge adjacent to the outer circumferential rim of the lens. The iris pattern has a width sufficient to obscure the natural iris when worn, and leaves a central optical zone 22 overlying the wearer's pupil unobscured.

The simulated iris pattern 20 preferably comprises ink comprising a pigment, dye or other colorant. The simulated iris pattern 20 can be virtually any color, and in preferred forms is a natural eye color such as blue, green, brown, or various combinations thereof. In alternate embodiments, the simulated iris pattern 20 is a non-natural eye color or color combination not typically occurring in humans. In further alternate embodiments, the simulated iris pattern 20 incorporates one or more patterns, logos, advertising or informational material, graphics or other designs. In still further embodiments, the simulated iris pattern 20 is a pattern that does not take the form of a natural iris, but rather is an unnatural iris pattern such as a cat-eye pattern or a geometric design. In a preferred form, the simulated iris pattern substantially entirely blocks color transmission from the underlying natural iris, which might inhibit the color-changing effect of the lens. In this manner, a simulated iris pattern 20 of a lighter color effectively masks a darker natural iris color.

The lens 10 further comprises a cover layer of PVA 30 overlying the simulated iris pattern 20 to substantially encapsulate the simulated iris pattern between the lens body and the cover layer 30. Preferably, the cover layer 30 is applied as an aqueous solution, without colorant.

A significant problem associated with colored contact lenses is the leaching of color from lenses that use pigments as coloring agents. The present invention provides a protective PVA coating to the pigment layers. Preferably, the PVA layer is on the posterior side of the lens; thereby further assisting in retaining the contact lens on the cornea because of its adhesive and bonding property. The presence of a PVA layer increases the resistance to abrasion, tensile strength, elongation, and flexibility, which in some cases enhance the quality of a lens. The presence of a PVA layer also imparts increased resistance to protein deposition, a desired property for a contact lens.

Also, because the PVA film constitutes polymerizable components similar to that of the lens material the film bears good adhesion to the lens matrix due to the formation of an interpenetrating network with the lens. The medicinal properties of PVA further warrant the use of a layer of polyvinyl alcohol in our contact lenses. For example, a dilute solution of PVA can be used as a vehicle to apply therapeutic agents to the eye. The PVA forms a film over the cornea along with the drug. As PVA is retained on the cornea more effectively because of its adhesive properties the drug can stay in contact with the eye for an extended period before tears wash it away. Another scenario for therapeutic purpose would be the use of a drug that is released over time from an ophthalmic vehicle, the PVA film in this case. There are examples in the scientific literature of using a PVA solution to form a protective layer over the cornea after an eye surgery. The PVA layer has been shown to play a role in accelerating the rate of regeneration of the epithelial cells on the cornea after the surgery.

Specific drugs that may be used in accordance with the invention include, but are not limited to, methylcellulose, hydroxyethyl cellulose, alginic acid, a mixture of pilocarpine dispersed in methylcellulose and combinations of these polymers. In addition, the leens can include pilocarpine, timolol maleate, dexamethesone, antibiotics, sulpha drugs and, without limitation, any other drug that can be used in the eye in drop form.

The cover layer 30 provides a number of advantages, including: (i) preventing leaching of the colored ink forming the iris pattern out of the lens during use, storage and/or cleaning; (ii) adhering to the lens matrix to prevent peeling and separation of the lens; and (iii) encapsulating the pigment present within the colored ink of the iris pattern for safety and comfort of the user. Of course, those skilled in the art will recognize that the opaque iris pattern 20 may optionally be omitted, and the resulting lens will retain separate utility. It will also be understood that the depicted positions, relative sizes and shapes of the lens body, the simulated iris pattern 20 and the cover layer 30 are for reference and understanding only, and are not intended to be to scale or to approximate actual characteristics of the respective components.

Figure 2:
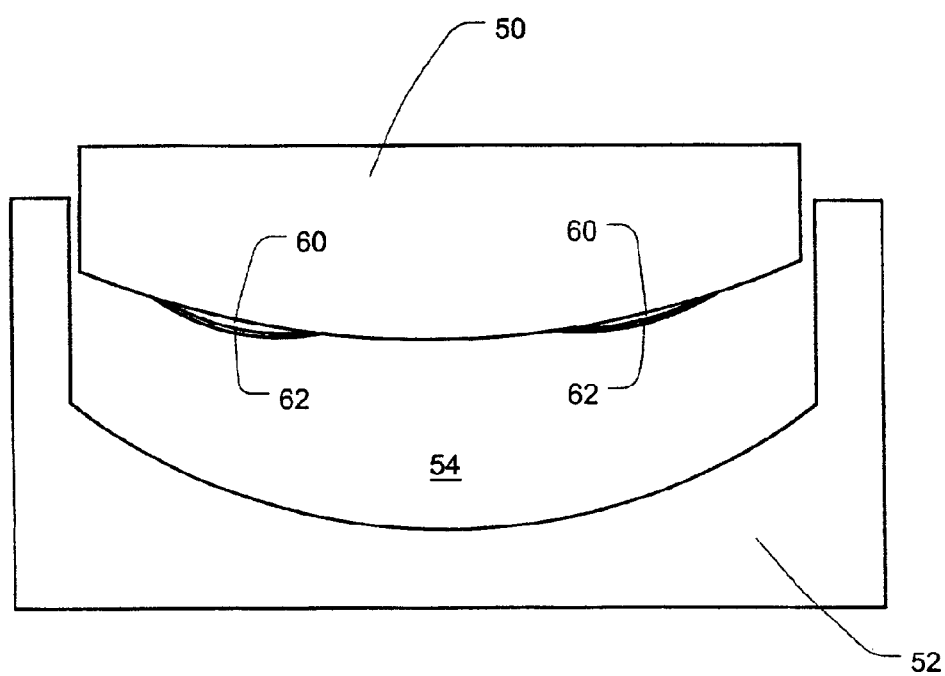
FIG. 2 is a cross-sectional side view of a mold for forming a contact lens according to a preferred form of the present invention.

The lens 10 of the present invention can be fabricated by casting in a mold, turning on a lathe, and/or by any appropriate lens-forming techniques. Likewise, the simulated iris pattern 20 and cover layer 30 can be applied into or onto the lens body by printing, stamping, or any appropriate application method. A preferred method of fabrication is described with particular reference to FIG. 2, and various examples are described with reference to FIGS. 3–15. A male mold half 50 cooperates with a female mold half 52 to define a lens forming chamber 54. It will be understood that the mold configuration depicted by FIG. 2 is by way of example only, and is not intended to represent actual mold geometry or necessarily be to scale. An aqueous PVA solution 60 and ink comprising colorant 62 are applied to one or both mold halves 50, 52 to form the cover layer 30 and simulated iris pattern 20 respectively. In the depicted embodiment, the aqueous PVA solution 60 and ink comprising colorant 62 are applied to a convex face of the male mold half 50, which face forms the concave base surface 12 of the lens. The aqueous PVA solution 60 is applied to the mold half, and the ink comprising colorant 62 is applied as one or more pattern elements over the PVA layer, whereby transfer of the PVA solution inks to the lens upon molding results in the PVA layer overlying and encapsulating the ink comprising colorant within the finished lens 10. The lens 10 is preferably formed by casting lens material into the chamber 54, and polymerizing and curing the material according to known lens molding techniques; preferably by exposure to UV radiation. In this manner, the iris pattern and cover layer become embedded into the lens itself to form an integral, unitary body, with the iris pattern and cover layer preferably bonded chemically and/or adhesively to the remainder of the lens.

In a preferred form of the present invention, the aqueous PVA solution 60 and ink comprising colorant 62 are applied to the mold 50, 52 by transfer printing. The inks are applied to a cliché pattern, and then transferred from the cliché pattern to the mold via a transfer printing pad. The inks are subsequently transferred from the mold into the lens during the casting process. Preferably, the aqueous PVA solution 60 is first applied to the mold by transfer printing in a substantially continuous, solid annular ring pattern. It is preferred, but not required, to dry out the aqueous PVA solution before the iris pattern is applied thereto, leaving a layer of PVA upon the mold half. This is likely to happen within a few minutes through evaporation by air-drying. Alternatively, the solution can be dried using any one of known drying methods (e.g. heat). It is preferred that the PVA layer be less than 100 microns, preferably less tan 20 microns thick, and more preferably less than 15 microns. The most preferred thickness for the PVA layer is about 10 microns. The ink comprising colorant 62 is then applied over the PVA layer by transfer printing in one or more pattern elements to form the desired opaque simulated iris pattern 20.

In preferred form, a plurality of different pattern elements combine to form the simulated iris pattern 20. One or more of the different pattern elements preferably comprise a variegated or otherwise discontinuous pattern. More preferably, two or more of the plurality of different pattern elements are variegated or otherwise discontinuous, and cooperate or "interlock" in a complementary fashion, whereby the discontinuous pattern elements combine to form a continuous and fully opaque simulated iris pattern. The different pattern elements that combine to form the simulated iris pattern 20 preferably comprise different colors applied in a pattern to simulate the appearance of a natural iris. It will be understood that pattern elements of "different colors" include pattern elements of entirely distinct color (e.g., green and brown) and/or of different shades or gradations of the same color (e.g., dark blue and light blue). For example, different color sequences are described below with reference to a combination of cooperating pattern elements described with reference to FIGS. 3–7. The additive effect of sequential layers of color gives a different and more natural hue to the final color of the iris pattern 20. While certain of the individual pattern elements are discontinuous, they combine to form a continuous opaque pattern when applied in proper alignment and registration with one another. Similarly, any open spaces within the pattern of FIG. 6 or FIG. 7 are filled by the patterns of FIGS. 4 and/or 5, when applied in proper registration. To compensate for any slight misalignment or mis-orientation of the individual pattern elements, it may be desirable to provide the pattern elements with a slight overlap at the pattern edges.

The present invention preferably further comprises providing the simulated iris pattern 20 with a selective color gradation and/or shading to produce the appearance of a flat iris. For example, when applied to a convex surface, darker colors in a pattern appear to recede, whereas lighter colors appear to come forward. Accordingly, by appropriately shading an inner region, or portions thereof, more darkly than an adjacent outer region, an iris pattern applied to a three-dimensional, convex surface appears generally two-dimensional or flat. In a preferred form of the present invention, the simulated iris pattern 20 comprises an annular ring having inner and outer edges. An inner region adjacent the inner edge is more darkly shaded than adjacent portions of the iris pattern. In this manner, the more central portions of the iris pattern nearer the apex of the convex lens surface appear to recede relative to the remainder of the iris pattern, generating the appearance of a generally flat iris, despite the convexity of the surface to which the lens pattern is applied. The iris pattern preferably comprises a substantially smooth color transition between the more darkly shaded inner region and less darkly shaded adjacent portions. Several example embodiments of the selective color gradation and/or shading of the present invention will be better understood with reference to the elements of the iris patterns shown respectively in FIGS. 3–7, as detailed below.

PVA Solution Composition:

Polyvinyl alcohols are polymers of vinyl alcohol. As the latter cannot exist in free form, all polyvinyl alcohols have so far been manufactured by polymerization of vinyl acetate, which unlike vinyl alcohol, is stable. The polyvinyl acetate produced then undergoes alcoholysis. As the technical properties of polyvinyl alcohol depend in the first place on the molar mass and residual acetyl group content, industrial manufacturing processes are designed to ensure exact adherence to these parameters.

Although in practice water is virtually the only solvent used for PVA, a number of other suitable solvents or solvent mixtures do exist. While the solution is preferably free of solvents other than water, it is understood that other solvents may be used in place of, or in conjunction with water. Solutions up to 15% are considered suitable for use in the present invention. However, it is recognized that the optimal concentration will depend on the grade of PVA and the rate at which it is applied to the mold. Such concentrations will wither be apparent or easily determinable by those of skill in the art through routine experimentation. The presently preferred PVA solution is a 5% aqueous solution of MOLWIOL 20–98 PVA, commercially available from Clariant.

Polymers are identified, among other things, by their molar mass or degree of polymerization, the mean average weight $M_w$ or $P_w$ in relation to their molecule size.

In the case of polymers the molar mass values obtained always depend on the method of determination. Accordingly, comparisons are permissible only if the values have been obtained by the same methods under identical conditions. As used herein, the mean weights of the molar masses Mw indicate values determined by gel permeation chromatography (GPC) combined with static light scattering (absolute method) on re-acetylized specimens. The accuracy of given values is about ±15%. The $P_w$ for a given polymer is a calculated value derived from the Mw and the degree of hydrolysis.

For practical purposes an exact knowledge of the molar mass or the degree of polymerization is often only of secondary importance. For most applications it is quite sufficient to select the viscosity associated with these values for the (freshly produced) 4% aqueous solution and to know the degree of hydrolysis.

The mean average weight $M_w$ of various PVA grades can range from 14,000 to 205,000; and the $P_w$ ranges from 270 to 4300. Preferably, the $M_w$ of the PVA is about 125,000 and the $P_w$ is about 2800.

The procedure for making a 5% PVA solution is as follows:

A jacketed beaker, containing a spin-bar, was connected to a water bath circulator. The jacketed beaker was then loaded with 5 g of Clariant Mowiol20–98 poly(vinyl alcohol). To this was added 95 jacketed beaker were stirred manually using a spatula until all of the PVA particles were wet with water. The jacketed beaker was covered with a watch-glass to prevent water loss during heating. A magnetic stirrer was placed under the jacketed beaker and the contents were stirred. The circulating water bath was turned on and set to 98° C. The solution was allowed to stir for 2 hours at the desired temperature. Any particles that remain undissolved were dislodged from the walls of the beaker and allowed to dissolve. The beaker remain covereded with the watch glass. The solution was allowed to cool to room temperature while continuing to stir with the magnetic stirrer. Any condensate on the watch glass was drained back into the solution and the stirrer was turned off when the solution appeared homogeneous. The solution was filtered through a 5.0-$\mu$ hydrophilic filter, in desired aliquots, into Pyrex autoclavable bottles. The filled bottles were autoclaved and wrapped with aluminum foil to protect them from light exposure.

If a pharmaceutically active compound is desired to be included, it may be applied with the PVA layer or over the layer before the monomer is dispensed into the mold. One of skill in the art will recognize the need to ensure the compatibility of the pharmaceutically active compound and the lens components.

Ink Compositions:

The present invention further comprises various ink compositions for use in fabricating a lens as described above. Desirable properties of the ink composition include (i) adhesion to the mold material (rather than "beading up" and distorting the inked pattern); (ii) capability to accept one or more additional overlying ink layer(s) without an underlying layer dissolving, fracturing or otherwise significantly distorting; (iii) pattern-retaining compatibility with lens material whereby an inked pattern does not dissolve, fracture or significantly distort when lens material is cast into the mold; and (iv) ease of transfer of the patterns from the mold surface and incorporation and binding of inks into the lens material. With respect to (i) above, it should be noted that beading can be avoided by corona treating the molds or coating the molds with a primer. In a first example of an ink composition, the colored inks used to form the simulated iris pattern 20 preferably comprises a lens material-based ink composition, i.e., the ink should contain a component also contained in the lens polymer. For example, for lens bodies comprising hydroxyethylmethacrylate (HEMA)-based lens material, an ink composition comprising HEMA is preferably utilized:

Parent Ink Composition # 1:

| Component: | Weight (g) | Wt. % (w/Pigment) |
|---|---|---|
| Isopropyl alcohol (IPA, CAS # 67-63-0) | 42.5 g | 57 |
| Hydroxyethyl methacrylate (HEMA, CAS # 868-77-9) | 8.7 g | 12 |
| Benzoin Methyl Ether (BME, CAS # 3524-62-7) | 0.02 g | (trace) |

Parent Ink Composition # 1: -continued

| Component: | Weight (g) | Wt. % (w/Pigment) |
|---|---|---|
| Polyvinyl pyrrolidone (PVP, CAS # 9009-39-8) | 13.5 g | 18 |
| Pigment ("daughter inks" - see below) | 10 g | 13 |

This ink has been found well-suited for use with polypropylene mold surfaces. The ink is preferably formulated as follows: The individual components shown above were measured out in separate containers. The isopropyl alcohol was taken in a capped 250 mL glass container. BME was added to IPA and the mixture was stirred using a mechanical stirrer at 250 rpm. When all of the BME was dissolved (<2 minutes) HEMA was added and the stirring continued for about 2 minutes. PVP was added gradually in portions over a period of 5–10 minutes to avoid the formation of any clumps. It is suggested that the container be covered while stirring to minimize solvent evaporation. During the addition of PVP the speed of the stirrer was gradually increased to 450–500 rpm. In order to avoid any accidental breakage care should be taken that the rotating blade of the mechanical stirrer does not come in contact with the glass container. When the solution was homogeneous, the pigment was added in portions and the stirring continued for another 5–10 minutes to yield a colored ink of choice.

Alternative ink compositions are provided below:

Parent Ink Composition # 2:

| Component: | Weight (g) | Wt. % (w/Pigment) |
|---|---|---|
| Vifilcon ™ A (HEMA-based lens material) | 10 g | 20 |
| Pigment ("daughter inks" - see below) | 2.5 g | 5 |
| Polyvinyl pyrrolidone | 8.3 g | 16 |
| Isopropyl alcohol | 30 g | 59 |

This ink composition has been found well-suited for application to polypropylene mold surfaces upon which a PVA layer has been deposited.

Parent Ink Composition # 3:

| Component: | Weight (g) | Wt. % (w/Pigment) |
|---|---|---|
| Vifilcon ™ A (HEMA-based lens material) | 10 g | 25 |
| Polyvinyl pyrrolidone | 4.1 g | 10 |
| Isopropyl alcohol | 20 g | 51 |
| Pigment ("daughter inks" - see below) | 5.5 g | 14 |

This ink composition has been found well-suited for application to polycarbonate or polymethylmethacrylate mold surfaces upon which a PVA layer has been deposited.

A variety of "daughter" inks can be prepared based on any of the above parent ink compositions using different FDA-approved pigments or mixtures thereof. The pigments include (1) titanium (IV) oxide white, (2) phthalocyanine green, (3) iron oxide red, (4) phthalocyanine blue, (5) iron oxide yellow, (6) chromophtal violet, (7) chromium oxide green, and (8) iron oxide black. Example combinations of pigment components used in the preparation of daughter inks, and their approximate quantities, include:

|  | Quantity (g) |
|---|---|
| "Pink" Pigment Composition: | |
| titanium (IV) oxide white | 100.0 g |
| iron oxide red | 100.0 g |
| "Light Blue" Pigment Composition: | |
| titanium (IV) oxide white | 158.8 g |
| phthalocyanine blue | 37.2 g |
| iron oxide red | 18.7 g |
| "Black Blue 2" Pigment Composition: | |
| phthalocyanine blue | 56.0 g |
| iron oxide black | 168.0 g |
| "Black" Pigment Composition: | |
| iron oxide black | 200.0 g |
| "Pthalo Green-Yellow" Pigment Composition: | |
| iron oxide yellow | 100.0 g |
| phthalocyanine green | 100.0 g |
| "Pthalo Green-Black" Pigment Composition: | |
| iron oxide black | 100.0 g |
| phthalocyanine green | 100.0 g |
| "Chromium Green-Black" Pigment Composition: | |
| chromium oxide green | 100.0 g |
| iron oxide black | 100.0 g |
| "Yellow" Pigment Composition: | |
| iron oxide yellow | 200.0 g |
| "Medium Amber" Pigment Composition: | |
| iron oxide yellow | 100.0 g |
| iron oxide red | 100.0 g |
| "Medium Amber 2" Pigment Composition: | |
| iron oxide yellow | 66.8 g |
| iron oxide red | 133.2 g |
| "Dark Amber" Pigment Composition: | |
| iron oxide red | 142.4 g |
| phthalocyanine green | 47.6 g |
| chromophtal violet | 10.5 g |

Figure 3:
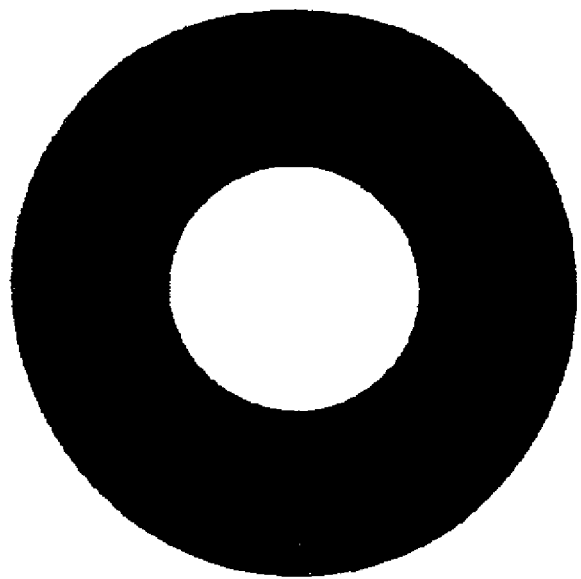
FIGS. 3–7 show cooperating pattern elements of a simulated iris pattern according to a preferred form of the present invention.
Figure 4:
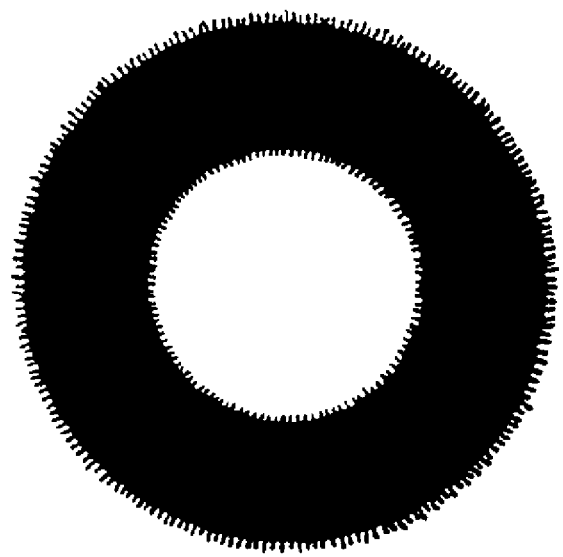
Figure 5:
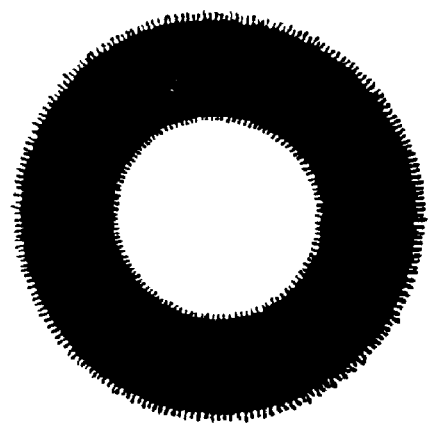
Figure 6:
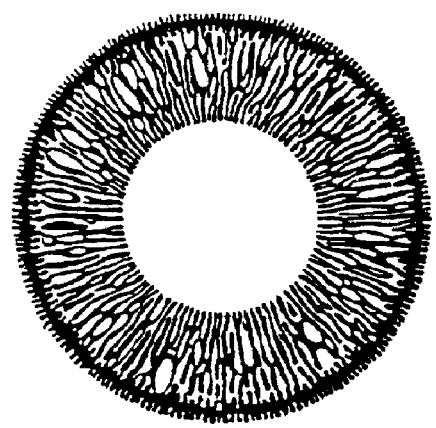
Figure 7:
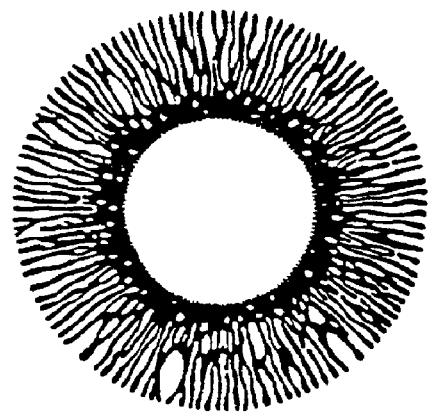

Example Color Pattern Combinations:

Examples of color pattern combinations according to the present invention are set forth below with reference to the cliché patterns of FIGS. 3–15, and the ink color compositions above. Pattern elements of the simulated iris pattern 20 are preferably applied to the mold via transfer printing in the specified sequence using different cliché patterns as depicted, in the ink color specified:

| Cliché Pattern | FIG. 3 | FIG. 4 | FIG. 5 | FIG. 6 or 7 |
|---|---|---|---|---|
| Blue Color Sequence 1: | | | | |
| Ink Color | PVA | Pink | Light Blue | Black Blue 2 |
| Blue Color Sequence 2: | | | | |
| Ink Color | PVA | Pink | Light Blue | Black |
| Green Color Sequence 1: | | | | |
| Ink Color | PVA | Pink | Pthalo Green-Yellow | Pthalo Green-Black |
| Green Color Sequence 2: | | | | |
| Ink Color | PVA | Chromium Green-Black | Yellow | Pthalo Green-Black |
| Amber Color Sequence 1: | | | | |
| Ink Color | Clear | Medium Amber 2 | Medium Amber 2 | Dark Amber |
| Amber Color Sequence 2: | | | | |
| Ink Color | Clear | Medium Amber 2 | Medium Amber | Dark Amber |

As noted above, accurate alignment and orientation of the individual pattern elements results in the combination of pattern elements interlocking in a complementary manner to form a continuous and opaque iris pattern. Lens material is cast into the mold, thereby effecting transfer of the PVA layer and printed iris pattern from the mold into the cured lens body. The described color and cliché pattern combinations result in a natural and realistic iris appearance. Of course, it will be understood by those skilled in the art that a variety of other color combinations and cliché patterns are within the scope of the present invention as well.

While the invention has been described in its preferred forms, it will be readily apparent to those of ordinary skill in the art that many additions, modifications and deletions can be made thereto without departing from the spirit and scope of the invention.

What is claimed is:

1. A contact lens comprising:
   a lens body formed of substantially transparent material;
   an opaque simulated iris pattern applied to said lens body; and
   a cover layer of polyvinyl alcohol less than 15 microns in thickness overlying said simulated iris pattern to substantially encapsulate said simulated iris pattern between said lens body and said cover layer;
   wherein said lens body comprises a concave base surface and a convex outer surface, and wherein said opaque simulated iris pattern is applied along the concave base surface.

2. The contact lens of claim 1, wherein said opaque simulated iris pattern comprises a plurality of discontinuous pattern elements of different colors, said plurality of discontinuous pattern elements interlocking to form a continuous and opaque pattern.

3. The contact lens of claim 1, wherein said opaque simulated iris pattern comprises an inner region that is more darkly shaded than adjacent portions of said simulated iris pattern.

4. The contact lens of claim 1, wherein said opaque simulated iris pattern comprises an ink comprising a monomer base and a pigment.

5. The contact lens of claim 1, wherein said polyvinyl alcohol cover layer further comprises a pharmaceutically active agent.

6. A contact lens comprising:
   a lens body formed of substantially transparent material;
   an opaque simulated iris pattern applied to said lens body; and
   a cover layer of polyvinyl alcohol overlying said simulated iris pattern to substantially encapsulate said simulated iris pattern between said lens body and said cover layer;

wherein said polyvinyl alcohol in the cover layer is has an average molecular weight of about 125,000.

7. A contact lens comprising:

a lens body formed of substantially transparent material;

an opaque simulated iris pattern applied to said lens body; and a cover layer of polyvinyl alcohol overlying said simulated iris pattern to substantially encapsulate said simulated iris pattern between said lens body and said cover layer; and wherein said polyvinyl alcohol cover layer is an annular ring.

8. A contact lens comprising:

a lens body formed of substantially transparent material having both a concave base surface and a convex outer surface;

a cover layer of polyvinyl alcohol on at least one of said concave surface or convex surface;

wherein said cover layer is less than 15 microns in thickness.

9. The contact lens of claim 8, wherein said cover layer is applied along the concave base surface.

10. The contact lens of claim 8, wherein said polyvinyl alcohol in the cover layer is has an average molecular weight of about 125,000.

11. The contact lens of claim 8, wherein said polyvinyl alcohol cover layer further comprises a pharmaceutically active agent.

* * * * *